D. M. McRAE.
COTTON PICKER.

No. 106,601.                               Patented Aug. 23, 1870.

Witnesses:                                 Inventor:

United States Patent Office.

DANIEL M. McRAE, OF WEBBERVILLE, TEXAS.

Letters Patent No. 106,601, dated August 23, 1870.

IMPROVEMENT IN COTTON-PICKERS.

The Schedule referred to in these Letters Patent and making part of the same.

*To all whom it may concern:*

Be it known that I, DANIEL M. McRAE, of Webberville, in the county of Travis and State of Texas, have invented a new and useful Improvement in Cotton-Pickers; and I do hereby declare that the following is a full, clear, and exact description thereof, which will enable others skilled in the art to make and use the same, reference being had to the accompanying drawing forming part of this specification.

This invention relates to improvements in machinery for picking cotton from the plants, and consists in a set of saws mounted on a truck, and geared with the driving-wheels, to run in the tops of the plants, (the lateral parts of which are brought within the range of the saws by gatherers in front,) and detach the cotton and convey it to a brushing-roller above, which detaches the cotton from the saws and delivers it into a receptacle behind, all as hereinfter more fully specified.

Similar letters of reference indicate corresponding parts.

A is the frame, and

Figure 1:
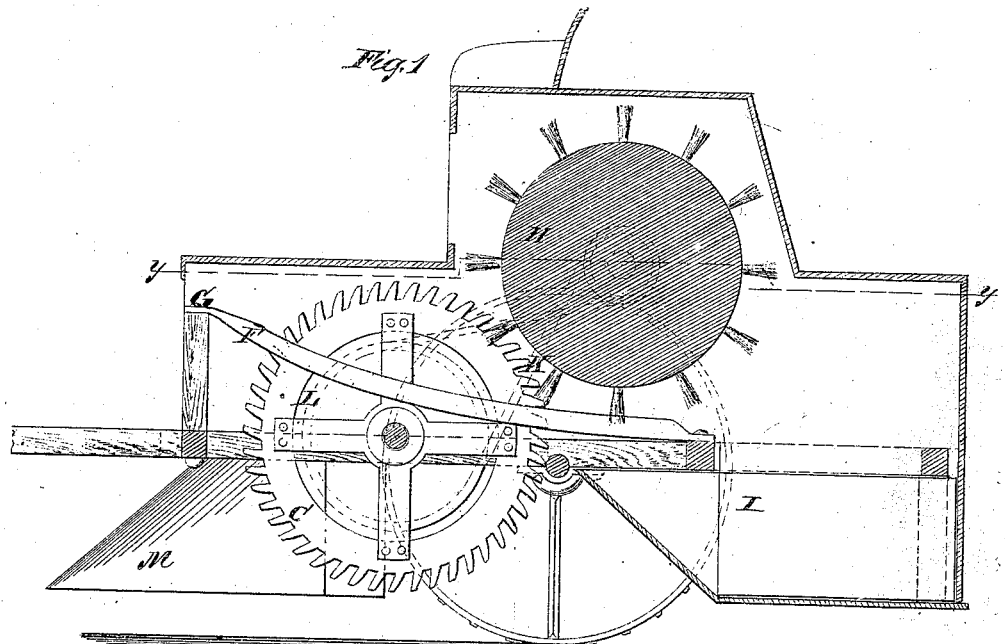
Figure 1 is a longitudinal sectional elevation of my improved cotton-picker, taken on the line $xx$ of fig. 2.
Figure 2:
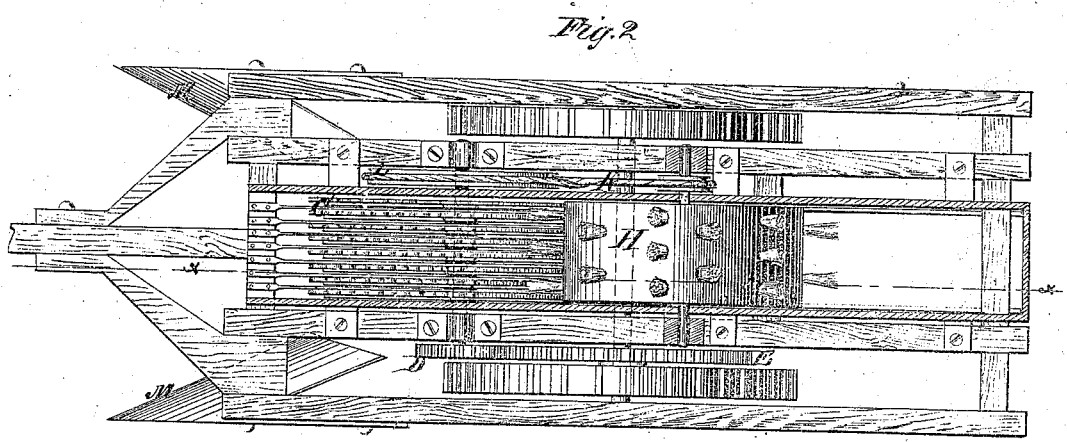
Figure 2 is a horizontal section through the line $yy$ of fig. 1.

B the wheels of a truck, of suitable construction to be drawn along the row of cotton-plants, with one wheel on each side, by horses or other animals.

C represents the saws, which may be of any preferred construction. They are arranged in a gang, and mounted in the front of the truck-frame, so as to run a short distance above the ground, and so that they move upward at the front.

The shaft of the saws is connected by a pinion, D, and large spur driving-wheel E, with one of the wheels of the truck so as to be set in motion thereby when the truck is moved along.

F represents guards, consisting of long thin bars attached to the rest G, and running rearward, one between each two saws, to prevent the sticks and other foul matter being carried up with the cotton.

H is the brushing-drum, arranged in the case at the rear upper side of the saws, to brush the cotton off the teeth of the saws into the receptacle I below.

This brushing-roller is designed to be rotated considerably faster than the saws, to insure the taking off of the fiber, and it is operated, in this instance, by a belt, K, working over a large pulley, L, on the saw-shaft. It may, however, be operated in any other approved way.

M represents plow-shaped gatherers, attached to the frame at the front, to run under the laterally hanging branches and gather them up to the range of the saws, to be acted on thereby.

It is believed that these saws will effectually strip the cotton from the branches of the plants without materially injuring them, in a very rapid and economical manner; but they are designed to be used only when the cotton is fully ripe.

Having thus described my invention,

I claim as new and desire to secure by Letters Patent—

The arrangement, in a cotton-picking machine, of the gatherers M, guards F, saws C, and brushing-drum H, as shown and described.

DANIEL M. McRAE.

Witnesses:
    I. FIELDS, M. D.,
    W. V. KENEASTER.